J. BARKER.
MIDDLINGS SEPARATOR.
No. 187,958. Patented March 6, 1877.
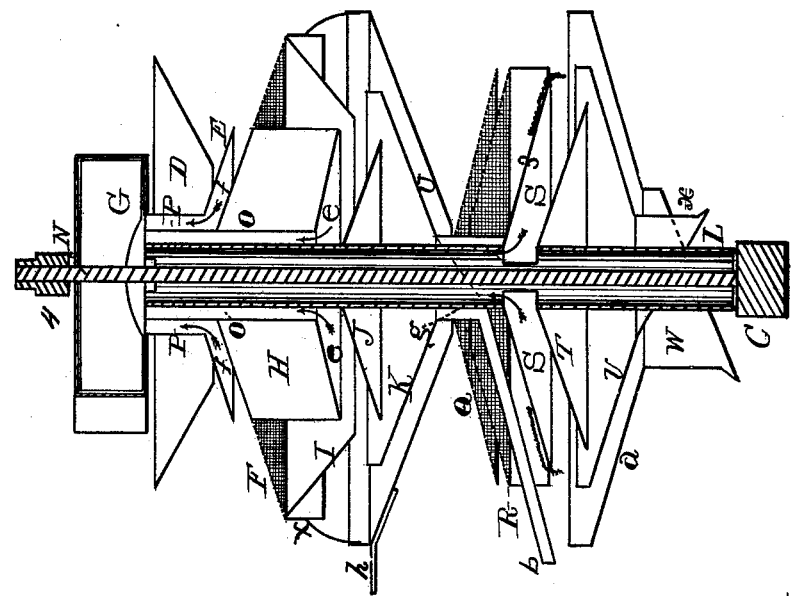
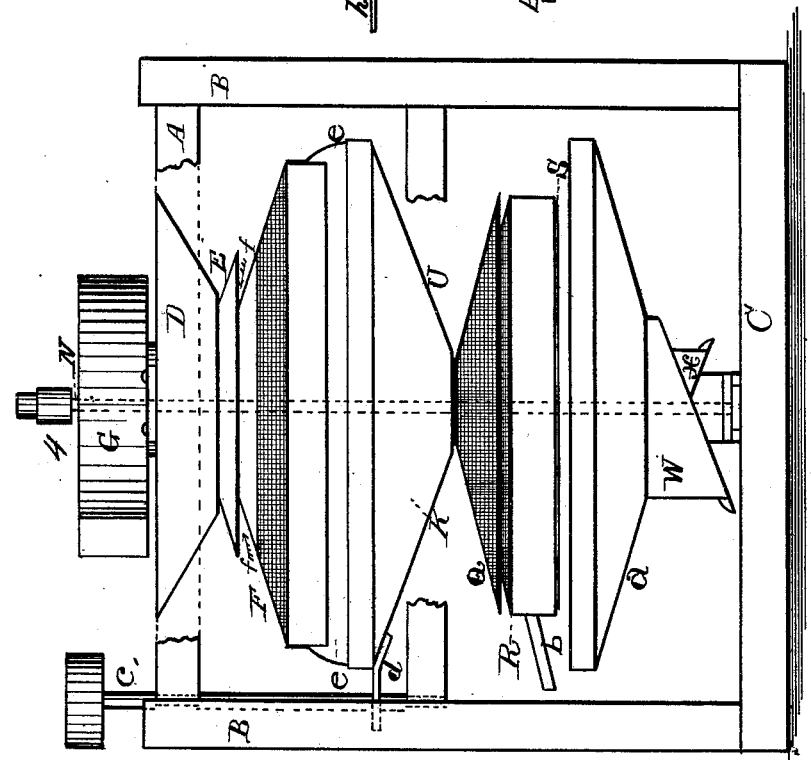

UNITED STATES PATENT OFFICE.

JOSEPH BARKER, OF CHICAGO, ILLINOIS.

IMPROVEMENT IN MIDDLINGS-SEPARATORS.

Specification forming part of Letters Patent No. 187,958, dated March 6, 1877; application filed June 2, 1876.

*To all whom it may concern:*

Be it known that I, JOSEPH BARKER, of Chicago, in the county of Cook and State of Illinois, have invented a new and useful Improvement in Middlings-Purifiers, of which the following is a specification:

The object of the present invention is to provide more efficient means for removing the bran and hull from ground wheat preparatory to regrinding the middlings; and its nature consists in a vertical cylinder surrounding the fan-shaft, and communicating with a suction-fan. Surrounding this center cylinder are two cylinders, also communicating with the fan, whereby a better and separate separation of middlings is attained.

The middlings are fed to a series of conical reciprocating sieves or perforated plates by a hopper, and as they pass from one sieve onto another the blast, by means of suitable pipes and openings, is made to pass through them and take up the light stuff, suitable deflectors being employed to direct the course of the middlings into one spout, and the bran or poor stuff into a separate spout.

In the drawings, Figure 1 is an elevation of my improved middlings-separator; Fig. 2, a central section thereof.

A B C represent a suitable frame for supporting the mechanism hereinafter described. N represents a suction-fan shaft, driving an ordinary fan, G, and resting on the frame-piece C. Surrounding this shaft N is a cylinder, L, and surrounding the latter are short cylinders P O, near the top of L. The object of the cylinder L is to provide a suction from the lower sieves Q R, and serves as a support for the other parts. The cylinders P O serve to give separate air-currents above and below the sieve F. F represents a perforated plate or sieve, which is supported by the cylinder O, and in the center of it is a blast-guide, H, consisting of hollow metal work, the lower line of which forms the top of suction $e$. Attached to the margin of sieve F is a deflector, I, deflecting into deflector K, attached to the cylinder L, and onto deflector K, which is attached to a short pipe, $g$, and surrounding the cylinder L; and to the rim $h$, and a little below the deflector K, is attached a deflector, U, which carries the stuff passing off of sieve F to sieve Q. This latter sieve, Q, and sieve R are conical in form, and attached to pipe $g$; and below them are affixed to L deflectors 3 T, and below deflector T are placed deflectors $v$ $a$, and spouts W and X, leading therefrom. T represents a deflector attached to cylinder L, and forms the lower part of air-passage S. $c$ represents a vertical shaft, which is to be provided with an eccentric, $e$, or crank turning in a plate, $d$, projecting out from the separator, for the purpose of giving to the latter a rotary agitation. The shaft $e$ may be driven by a belt from the fan-shaft or otherwise. The shaft N need not run through the cylinder, but may be short, and have a suitable support above the sieves.

Operation: The fan G is to be put in motion by a belt on pulley 4, and has given to it such a speed as to separate the light stuff from the middlings, which are fed to the sieves by means of a hopper, D. They pass over deflector E, and then fall into sieve F, except such part thereof as is carried up by the blast through space F. The center of the sieve F may be of solid metal, to catch the falling stuff from E, and guides it gradually onto sieve F, if desired, all the sieves having such solid centers, if deemed expedient. The finer particles pass through sieve F onto deflectors I K, and pass through pipes $g$ $b$ completely separated, being subjected, in such movement, to a blast through $e$, carrying the light stuff up through cylinder O, and discharging it through the fan G, as is all the light stuff taken up by the blast. The coarse stuff passes over the sieve F, and into deflector V, and onto sieves Q R. The fine middlings pass through these sieves Q R, and fall into deflector V, and are discharged at $x$ properly separated, being subjected, in their passage from Q R, to a blast through S T, taking up the light stuff through cylinder L. The coarser stuff, passing off from the sieves Q R, falls onto deflector $a$, and is discharged through spout W.

I claim and desire to secure by Letters Patent—

1. The air-cylinder L, surrounded by exterior air-cylinders O P, for the passage of air upward, in combination with stationary sieves F Q R, for separating the middlings, and deflectors 3 E J K I $a$ $v$, for conveying middlings from one sieve to the others, and discharging them outside of the cylinder L, and at the bottom of the separator, as set forth.

2. The cylinder L, provided with one or more surrounding cylinders, O P, in combination with sieves F Q R, deflectors 3 E J K I a v, suitable suction-fan G, and devices for imparting a shaking motion to the sieves c 8, as and for the purpose set forth.

3. The combination of concentric cylinders L O P, fan G, and sieves F, one or more of said sieves being provided with solid or imperforate centers, all arranged substantially as and for the purpose set forth.

JOSEPH BARKER.

Witnesses:
 O. H. ADIX,
 G. L. CHAPIN.